June 30, 1953  P. GLASS  2,644,085
VOLTAGE TRANSLATING MEANS
Filed Jan. 9, 1950

PAUL GLASS
INVENTOR.

BY
ATTORNEYS

Patented June 30, 1953

2,644,085

UNITED STATES PATENT OFFICE 2,644,085

VOLTAGE TRANSLATING MEANS

Paul Glass, Chicago, Ill., assignor to Askania Regulator Company, Chicago, Ill., a corporation of Illinois Application January 9, 1950, Serial No. 137,545

2 Claims. (Cl. 250—27)

The present invention relates to translation of direct voltage to recurrent wave form voltage of predetermined wave form and frequency. The invention includes conversion to alternating voltage of conventional sinusoidal or other wave form and selected frequency, or to unidirectional pulsing voltage, with the wave form of the pulses of any desired predetermined shape and frequency.

A primary object of the invention is the provision of a novel and inexpensive system for converting or translating direct voltage to a voltage of predetermined recurrent wave form, the amplitude of the latter being proportional to the magnitude of the direct current voltage in a highly accurate relation.

Another object is the provision of such a system that is extremely sensitive, being capable of converting very small direct voltages with a high degree of accuracy of predetermined proportional relation between amplitude of the output voltage and magnitude of the input direct voltage.

An additional object is the provision of a simple, highly sensitive and very accurate system for translating direct voltage to alternating voltage of proportional amplitude.

Referring to the invention in general, conversion or translation of direct to recurrent periodic voltage of predetermined wave form is accomplished by means of an electron beam tube provided with means for deflecting the beam of electrons from a normal or neutral path along which it is projected by an electron gun and to a degree proportional to magnitude of the direct voltage to be translated, which voltage is applied to energize beam-deflecting means. The tube is provided with anode or beam-receiving means so arranged as to intercept a cross-sectional area of the beam that varies in proportion to degree of deflection of the beam from its neutral path, and to produce an output voltage the magnitude of which varies proportionally with the cross-sectional area of the beam so intercepted. In its preferred form the invention employs a dual anode tube and a beam-deflecting arrangement that is sensitive to polarity of the applied voltage, so that cross-sectional areas of the beam intercepted by the respective anodes vary in inverse relation to each other, one in direct and the other in inverse proportion to the magnitude of the applied voltage. In this way the output voltage developed by an output network connected to the two anodes, has a polarity corresponding to that of the input direct voltage to be translated. Translation of the input voltage to the predetermined recurrent wave form is accomplished by periodically and recurrently varying the intensity of the electron beam prior to its interception by the anode arrangement, and preferably at a location between the electron gun and deflector system, such intensity variation being made in accordance with the predetermined wave form and at any preselected frequency.

Electron beam tubes suitable for use in a system arranged according to this invention are well known, as exemplified by U. S. patents to H. Ziebolz No. 2,314,302 dated March 16, 1943, and 2,358,901 dated September 26, 1944.

Figure 1:
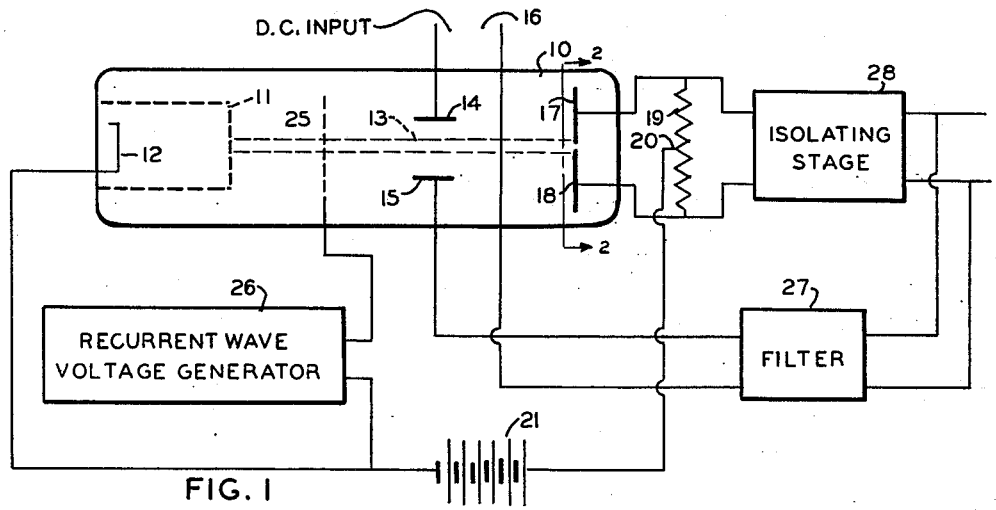
Fig. 1 is a schematic diagram of a system arranged according to one form of the invention.

Describing the drawings and first referring to Fig. 1, an electron beam tube of the kind in question is designated 10 and comprises an electron gun arrangement 11, shown in dotted lines since it may be conventional, and including a cathode 12, the arrangement being such as to project a beam of electrons along a normal or neutral path extended in a predetermined direction and represented by the dotted lines 13. Tube 10 also is provided at a suitable location along the beam path 13 with beam-deflecting means, shown in Fig. 1 as one of a pair of conventional electrostatic deflector plates 14, 15, but which equally well might be another form of conventional deflecting device, say a magnetic field-generating coil. The input 16 to the deflecting means comprises the signal input to the system, to which is applied the direct voltage to be converted.

Figure 2:
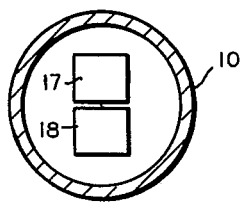
Fig. 2 is a sectional view on line 2—2 of Fig. 1.

The anode structure comprises a pair of plates 17, 18, which are arranged with parallel and adjacent edges in closely spaced relation, the spacing being greatly exaggerated in Figs. 1 and 2. Plates 17, 18 are so located relative to the normal path 13 of the beam, and relative to the location and arrangement of the beam-deflector means, as to respectively intercept cross-sectional areas of the beam that are equal when the beam is undeflected and following its neutral path 13, but which areas vary proportionally with degree of deflection of the beam from such path, such cross-sectional beam areas varying in inverse relation one to the other, one varying in direct and the other in inverse proportion to degree of beam deflection, as determined by polarity of the voltage applied to the deflector means. An output network comprises a resistance 19 having its respective ends connected with the anode plates 17, 18, and a mid-point 20 connected to the positive side of the high voltage supply 21. In effect this output network comprises means for summarizing the voltages produced by the respective anodes, and producing from them a resultant output voltage that appears across the resistance 19. Such a tube arrangement is well recognized as being an accurate direct current amplifier, having high sensitivity and substantial ranges of linear amplification for input direct voltage of either polarity.

For conversion of the input voltage to the desired recurrent periodic wave form, intensity of the electron beam is periodically varied at the intended frequency of the wave form voltage to which translation is to be made. Conveniently this is accomplished by means of a conventional control grid 25 disposed in the beam path 13 and arranged to vary intensity of the beam in proportion to variation of a control voltage applied to it. A voltage that has the desired frequency and wave form is applied to the grid 25 to vary intensity of the beam in accordance with the frequency and wave form of the voltage to which the direct input voltage is to be converted. Conveniently this intensity-varying wave form voltage is obtained from a periodic voltage wave generator, designated 26, the output of which is connected across the cathode 12 and intensity-control grid 25.

Operation of the system is readily understandable. Application of a direct voltage to input 16 serves to deflect the electron beam from its neutral path 13, in one of two opposite, radial directions determined by polarity of the voltage. Such deflection of the beam upsets the balance between cross-sectional beam areas intercepted by the respective anode plates 17, 18, and an unbalance of voltage across resistor 19 results, the system thus acting as a direct current amplifier of the voltage applied to input 16. Imposition upon intensity-control grid 25 of a recurrent wave form voltage, however, varies the magnitude of voltage appearing across resistance 19 in accordance with the frequency and wave form of such recurrent voltage. The amplitude of the wave form voltage thus appearing across resistance 19 is determined by and proportional to magnitude of the direct input voltage applied at 16, since the magnitude of the wave form voltage during the beam intensity-varying cycles is continuously determined by degree of beam deflections and therefore is continuously proportional to magnitude of the input direct voltage applied at 16 to the deflector system.

For stabilization, the output voltage across resistance 19 may be filtered by a conventional filter section 27 having a characteristic productive of ripple-free direct voltage output from an input of the preselected periodic voltage frequency, and the output of which is applied to the deflecting means as a negative feedback voltage, maintaining degree of beam-deflection accurately proportional to magnitude of the direct input voltage. In Fig. 1, such feedback is accomplished with the aid of an isolating stage 28, the purpose of which is to prevent appearance of the high anode-cathode voltage in the deflecting system. Stage 28 may be an amplifier. The output of filter 27, the input of which is energized by the output of stage 28, is shown connected with the second deflecting plate 15. It will be understood that such inversion and adjustment of magnitude of the stabilizing voltage as is necessary may be accomplished at a convenient point, as in stage 28.

Figure 3:
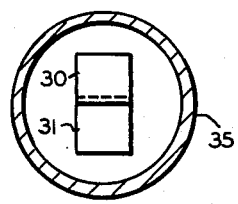
Fig. 3 is a sectional view similar to Fig. 2, showing a modified anode arrangement, the section being on line 3—3 of Fig. 4 which also discloses the anode arrangement.
Figure 4:
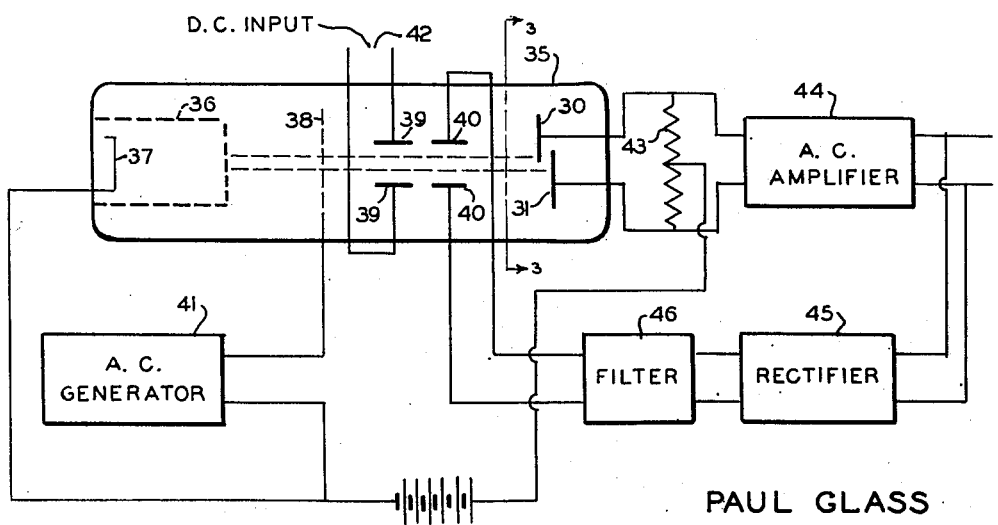
Fig. 4 is a schematic diagram of a system arranged for translating direct to alternating voltage, showing a slightly modified stabilizing arrangement of voltage-translating tube.

Instead of the side by side anode plates 17, 18, shown in Fig. 1, overlapped anode plates 30, 31 may be used as shown in Figs. 3 and 4. Such plates are narrowly spaced apart fore and aft of the axis of the tube, with the marginal portion of the forward and upper plate 30 intersecting the center line of the neutral beam path 13 and overlapping an upper marginal portion of the rearward and lower plate 31. This arrangement gives high sensitivity to small beam deflections since there is no neutral zone resulting from a gap between plate edges as in the other arrangement.

Fig. 4 shows a slightly modified system arranged for the specific purpose of converting or translating a direct voltage to an alternating voltage of amplitude proportional to magnitude of such direct voltage, a somewhat modified stabilizing feedback arrangement also being shown.

As in Fig. 1, the tube, designated 35, has an electron gun arrangement 36 including a cathode 37, a beam intensity-control grid 38, and a pair of anodes 30, 31 arranged in the overlapping disposition described above. The tube 35, however, is provided with a pair of primary or signal deflecting plates 39 and a pair of stabilizing plates 40. For translation to alternating voltage, means are provided for applying to the intensity-control grid 38 a sinusoidally varying voltage of the frequency of the alternating voltage to which translation is to be made. Conveniently a source of alternating voltage shown as a generator or alternator 41 is connected across the cathode 37 and grid 38. By this arrangement, and in the general manner described with respect to Fig. 1, application of a direct voltage to the deflecting system 39 through signal input 42, and application of sinusoidally varying voltage to grid 38 will result in deflection of the beam from its normal path, unbalance of voltage across an output resistance 43 to the mid-point of which anode voltage is supplied, and a resultant sinusoidally varying direct voltage, which may be regarded as an alternating voltage with a direct current component, will appear across resistance 43. This voltage may be converted to true alternating voltage, or the direct component removed, by such means as an alternating current amplifier 44 to the signal input of which the ends of output resistance 43 are coupled. While amplifier 44 may be simply a transformer, it is preferably of frequency-discriminating character that will accept only the frequency of the voltage to which translation is to be made, namely, that of the grid-energizing source, as 41.

For stabilizing purposes, a rectifier 45 is coupled to the output of amplifier 44, its output is smoothed by a filter section 46, and the output of the latter is applied to the second or stabilizing deflector system, shown as comprising the second set of plates 40.

In connection with Fig. 4, it is to be understood that application of voltages to the respective plates 39, and the respective plates 40 is in accordance with standard cathode ray tube practice insofar as application of voltages of opposite polarities to the respective paired plates is concerned. As in Fig. 1, any necessary inversion or adjustment of feedback voltage magnitude may be accomplished as convenient between the output resistance 43 and the stabilizing plates 40.

From the foregoing it will be seen that the invention presents a very simple yet highly sensitive and accurate system for conversion or translation of direct voltage to alternating or other recurrent wave form voltage, and that numerous changes in the specific arrangements may be made without departing from the scope of the invention.

I claim:

1. A system for translating direct voltage to voltage of periodically recurrent preselected wave form of amplitude proportional to magnitude of said direct voltage; said system comprising means for projecting an electron beam along a path extended in a predetermined direction, means arranged for energization by direct voltage to be translated and for deflecting said beam in opposite predetermined directions in correspondence to polarity of said voltage, a pair of anode plates respectively extended in said opposite directions from a line bisecting said path at right angles to said deflection directions, means for periodically and recurrently varying the intensity of said electron beam in correspondence with the preselected wave form, and a negative feedback circuit coupled in inverse stabilizing feedback arrangement between said anode plates and said beam-deflecting means, and comprising an input coupled across said anode plates and including filter means having an input coupled with said circuit input and an output connected with said beam-deflecting means.

2. A system for translating direct voltage to voltage of periodically recurrent preselected wave form of amplitude proportional to magnitude of said direct voltage; said system comprising means for projecting an electron beam along a path extended in a predetermined direction, means arranged for energization by direct voltage to be translated and for deflecting said beam in opposite predetermined directions in correspondence to polarity of said voltage, a pair of anode plates respectively extended in said opposite directions from a line bisecting said path at right angles to said deflection directions, means for periodically and recurrently varying the intensity of said electron beam in accordance with the preselected wave form, circuit means connected with said anodes for developing an alternating output voltage of amplitude and phase respectively proportional and corresponding to degree and direction of deflection of said beam, an amplifier having control signal voltage input means coupled with said circuit means, rectifier filter means coupled with the output of said amplifier, for producing a direct voltage of magnitude and polarity respectively corresponding to amplitude and phase of an alternating voltage applied to said signal input means, and circuit means for applying a voltage produced by said rectifier and filter means to said beam-deflecting means in opposition to a direct voltage applied thereto to deflect said beam.

PAUL GLASS.

References Cited in the file of this patent

UNITED STATES PATENTS

| Number | Name | Date |
|---|---|---|
| 2,064,469 | Haeff | Dec. 15, 1936 |
| 2,357,922 | Ziebolz et al. | Sept. 12, 1944 |
| 2,383,758 | Ziebolz | Aug. 28, 1945 |
| 2,441,269 | Hartig | May 11, 1948 |
| 2,528,020 | Sunstein | Oct. 31, 1950 |